US012093413B2

(12) United States Patent
Adams et al.

(10) Patent No.: US 12,093,413 B2
(45) Date of Patent: Sep. 17, 2024

(54) ELECTRONIC DEVICE AND METHOD OF PROVIDING INFORMATION FOR DISPLAY

(71) Applicant: Malikie Innovations Limited, Dublin (IE)

(72) Inventors: Neil Patrick Adams, Waterloo (CA); Robert Joseph Lombardi, Hamilton (CA); Jeremy Lawson Kominar, Waterloo (CA)

(73) Assignee: Malikie Innovations Limited, Dublin (IE)

( * ) Notice: Subject to any disclaimer, the term of this patent is extended or adjusted under 35 U.S.C. 154(b) by 266 days.

(21) Appl. No.: 16/007,703

(22) Filed: Jun. 13, 2018

(65) Prior Publication Data

US 2019/0384924 A1 Dec. 19, 2019

(51) Int. Cl.
| | |
|---|---|
| *G06F 21/62* | (2013.01) |
| *H04N 1/44* | (2006.01) |
| *G06F 21/32* | (2013.01) |

(52) U.S. Cl.
CPC ...... *G06F 21/6209* (2013.01); *G06F 21/6254* (2013.01); *H04N 1/444* (2013.01); *H04N 1/448* (2013.01); *G06F 21/32* (2013.01)

(58) Field of Classification Search
CPC . G06F 21/6209; G06F 21/6254; H04N 1/444; H04N 1/448
USPC .......................................................... 726/26
See application file for complete search history.

(56) References Cited

U.S. PATENT DOCUMENTS

| | | | |
|---|---|---|---|
| 6,954,532 B1 | 10/2005 | Handley et al. | |
| 7,536,635 B2 | 5/2009 | Racovolis et al. | |
| 8,522,050 B1 | 8/2013 | Wakerley | |
| 9,015,301 B2* | 4/2015 | Redlich | G06Q 10/10 709/223 |
| 2008/0012873 A1* | 1/2008 | Nishiwaki | H04N 19/467 345/581 |
| 2008/0209572 A1* | 8/2008 | Kano | G06F 40/131 726/28 |
| 2009/0254572 A1* | 10/2009 | Redlich | G06Q 10/107 |
| 2009/0323087 A1 | 12/2009 | Luo | |
| 2014/0366158 A1* | 12/2014 | Han | G06F 21/32 726/28 |

(Continued)

OTHER PUBLICATIONS

Garfinkel, "Leaking Sensitive Information in Complex Document Files—and How to Prevent It", 2013, IEEE, pp. 20-26 (Year: 2013).*

(Continued)

*Primary Examiner* — Piotr Poltorak
*Assistant Examiner* — Gregory A Lane
(74) *Attorney, Agent, or Firm* — Conley Rose, P.C.; J. Robert Brown, Jr.

(57) ABSTRACT

A method of providing information for display, from a portable electronic device, includes displaying information on a display of the portable electronic device, identifying a portion for redacting from the information displayed on the display of the portable electronic device, extracting the portion from the information to provide redacted information and an extracted portion, storing the redacted information, protecting and storing the extracted portion in association with a location identification in a file, and sending the redacted information and sending the file including extracted portions associated with the location identifiers.

20 Claims, 8 Drawing Sheets

(56) References Cited

U.S. PATENT DOCUMENTS

| | | | |
|---|---|---|---|
| 2015/0074615 A1* | 3/2015 | Han | G06F 21/31 |
| | | | 715/863 |
| 2017/0124347 A1* | 5/2017 | Kamata | G06F 16/93 |
| 2017/0220813 A1* | 8/2017 | Mullins | G06F 21/6218 |
| 2018/0046758 A1* | 2/2018 | Gogin | G16H 30/20 |
| 2018/0089459 A1 | 3/2018 | Eisen et al. | |

OTHER PUBLICATIONS

Screen Draw Screenshot Lite—Android Apps on Google Play, 4 pages. [retrived on Jul. 28, 2017] Retrived from the Internet [URL:https://play.google.com/store/apps/details?id=com.kewitschka.screendrawlite&hl=en].

European Patent Application No. 19176558.5, Extended European Search Report dated Oct. 21, 2019.

* cited by examiner

ELECTRONIC DEVICE AND METHOD OF PROVIDING INFORMATION FOR DISPLAY

FIELD OF TECHNOLOGY

The present disclosure relates to providing information for display on an electronic device.

BACKGROUND

Electronic devices, have gained widespread use and may provide a variety of functions including, for example, telephonic, electronic messaging and other personal information manager (PIM) application functions. Electronic devices include several types of devices including mobile stations such as simple cellular telephones, smart telephones, wireless PDAs, and computers.

Such electronic devices are often able to display various types of information to a user. In some situations, protection of the information to inhibit viewing by unauthorized individuals is desirable. Redaction of information may be useful in such instances. Two versions of information may be utilized, including a version prior to redaction and a version post-redaction to protect the information from unauthorized individuals and to facilitate viewing by authorized individuals.

Improvements in protection of such information are desirable.

BRIEF DESCRIPTION OF THE DRAWINGS

Embodiments of the present disclosure will now be described, by way of example only, with reference to the attached figures, in which.

DETAILED DESCRIPTION

The following describes an electronic device including a display and a method of providing information for display, from the portable electronic device. The method includes displaying information on a display of the portable electronic device, identifying a portion for redacting from the information displayed on the display of the portable electronic device, extracting the portion from the information to provide redacted information and an extracted portion, storing the redacted information, protecting and storing the extracted portion in association with a location identification in a file, and sending the redacted information and sending the file including extracted portions associated with the location identifiers.

The redacted information and the file are received at a recipient portable electronic device. In response to receipt of a passphrase or key associated with the extracted portions, the extracted portions are unlocked or decrypted, and inserted into the redacted information utilizing the location identifiers to provide un-redacted information at the recipient portable electronic device.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device. Examples of electronic devices include mobile, or handheld, wireless communication devices such as cellular phones, cellular smart-phones, wireless organizers, personal digital assistants, computers, tablet computers, mobile internet devices, electronic navigation devices, and so forth.

Figure 1:
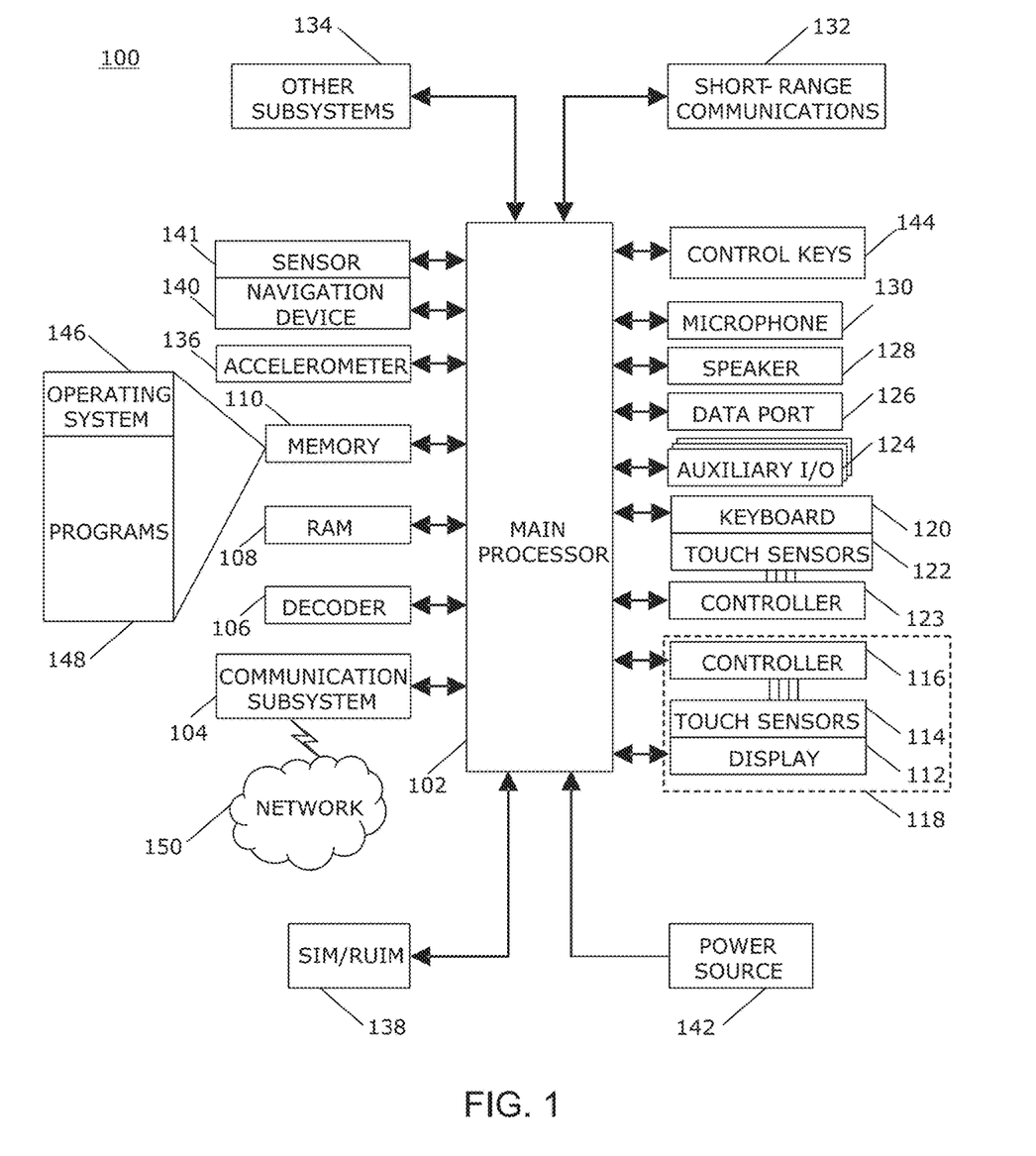
FIG. 1 is a block diagram of a portable electronic device in accordance with the present disclosure.

A block diagram of one example of an electronic device 100, which in the present example is a portable electronic device, is shown in FIG. 1. The electronic device 100 includes multiple components, including a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132, and other device subsystems 134. The speaker 128, also referred to as an earpiece speaker, is utilized to output audible signals when a user's ear is very close to the speaker 128. Although not shown, the processor may also interact with a loudspeaker, for example, for hands-free use.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

The keyboard 120 includes a plurality of keys, which may be mechanical keys that include mechanical switches or contacts for input to the electronic device 100 when a mechanical key of the keyboard 120 is depressed by a sufficient force to oppose a bias of the mechanical key. In addition, the keys of the keyboard 120 may include touch sensors 122 coupled to a controller 123 to detect touch input thereon. The controller may be a keyboard controller 123 as illustrated in FIG. 1. Alternatively, the keys of the keyboard 120 may be coupled to the controller 116 utilized to detect touches using the touch sensors 114 of the touch-sensitive display 118.

The processor 102 may also interact with control keys 144 and, optionally, a navigation device 140. The control keys 144 may include, for example, a send key, a menu key, an escape key, an end key, or any other suitable control keys. The navigation device 140 may be a touch-sensitive track pad, an optical joystick, or any other suitable navigation device to interface with a user to provide input. The navigation device 140 may be utilized, for example, to navigate or scroll through information on a display, control a cursor or other indicator, edit information, and so forth.

The processor 102 may also interact with a biometric sensor 141 for obtaining data to authenticate a user. The biometric sensor 141 may be a fingerprint sensor disposed on the navigation device for detecting a touch thereon and obtaining fingerprint data upon receipt of a touch on the navigation device. Other biometric sensors may also be successfully implemented. For example, an iris scanner or other suitable detector may be utilized for the purpose of authenticating a user.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the keyboard may be any suitable touch sensors, such as capacitive touch-sensors, and may comprise any suitable material, such as indium tin oxide (ITO). Optionally, the touch sensors 122 disposed on the keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected utilizing the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

As indicated above, the biometric sensor 141 may be a fingerprint sensor disposed on the navigation device 140 for detecting a touch thereon and obtaining fingerprint data upon receipt of a touch on the navigation device. The fingerprint sensor may include a plurality of transmit and receive electrodes that are disposed in a grid pattern. The transmit electrodes are very closely spaced and receive electrodes are very closely spaced relative to the electrodes of the touch-sensitive display, for example, to provide a very fine grid pattern. The fine grid pattern provides very fine resolution suitable for identifying a fingerprint pattern and for detecting conductivity of ridges and valleys in a fingerprint.

Optionally, the navigation device 140 may be utilized to detect the presence of a finger on the biometric sensor 141 and, in response, the biometric sensor 141 may obtain fingerprint data for authentication purposes.

The processor 102 receives the biometric data from the sensor 141 and compares the biometric data to biometric data stored, for example, in memory 136 to authenticate a user. A match or at least partial match of the biometric data from the sensor 141 results in authentication. The biometric data may therefore be utilized, for example, to unlock the electronic device 100, to access applications, documents, or information on the electronic device 100, or for any other suitable purpose.

Figure 2:
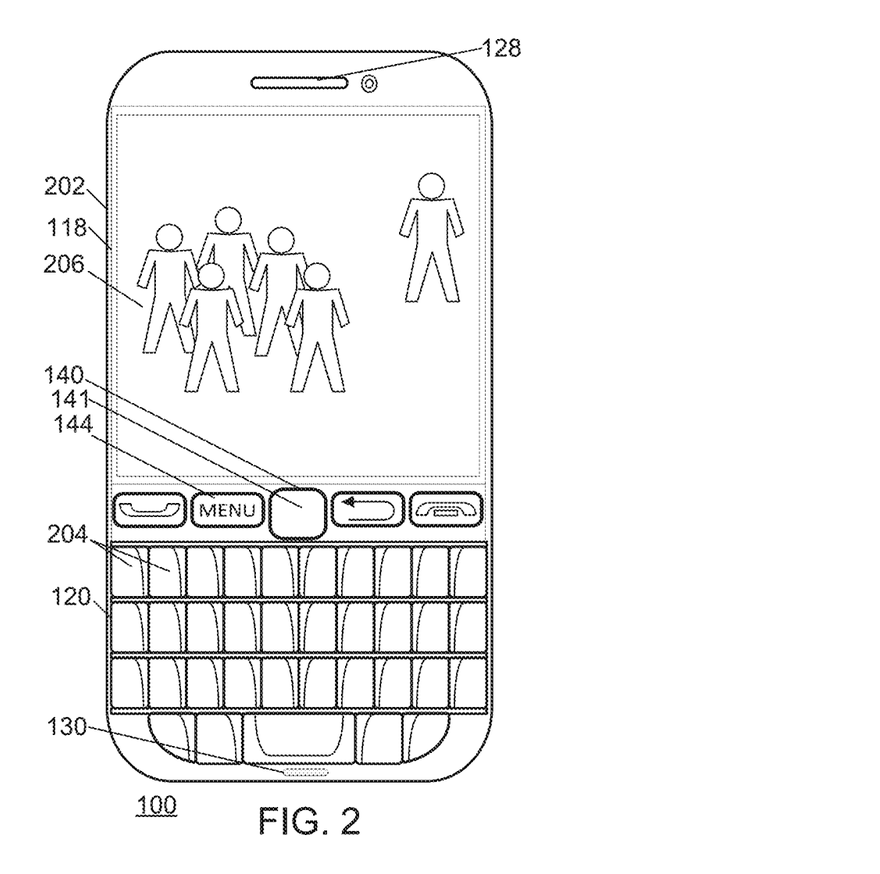
FIG. 2 is a front view of an example of an electronic device in accordance with the present disclosure.

An example of an electronic device displaying information is shown in FIG. 2. In the present example, the electronic device 100 includes a housing 202 in which the touch-sensitive display 118 is disposed. The housing 202 is utilized to enclose components such as the components shown in FIG. 1. The mechanical keyboard 120 is disposed below the touch-sensitive display 118 in the orientation illustrated in FIG. 2.

The mechanical keyboard 120 includes a plurality of keys 204. Each of the keys 204 of the keyboard 120 is associated with a character such that a character is entered utilizing a key 204. The keyboard 120 in the present example, includes four rows of keys 204 other numbers of rows of keys may be implemented, however.

The control keys 144 in this example are generally aligned in a row disposed between the touch-sensitive display 118 and the keyboard 120. In this example, the control keys include a send key, a menu key, an escape key, and an end key. Other suitable control keys can be utilized, however.

The navigation device 140 is disposed in the center of the row of control keys 144. For the purpose of the present example, the navigation device 140 is an optical joystick for user input. The biometric sensor 141 may be disposed on the navigation device 140 to facilitate authentication of a user during use of the navigation device 140. Thus, as a user utilizes the navigation device 140, for example, for scrolling or to control a cursor, the biometric sensor 141 provides data to the processor 102 (shown in FIG. 1) for authentication of the user.

Because the biometric sensor 141 is located on the navigation device 140, the navigation device may be utilized to detect a touch by detecting the presence of a finger or thumb of a user and, in response to detecting the presence of a finger or thumb, the biometric sensor 141 begins sensing to obtain fingerprint data. Thus, the navigation device 140 facilitates selective use of the biometric sensor 141 such that the biometric sensor is not continually attempting to obtain fingerprint data even in the absence of a finger or thumb on the navigation device 140, thus reducing power use.

The speaker 128 and the microphone 130 are disposed in openings in the housing 202. As indicated above, the speaker 128 outputs audible information and the microphone 130 is utilized to convert audible information into electrical signals for processing.

For the purpose of the example of FIG. 2, information 206 that is received is displayed on the touch-sensitive display 118. The information displayed may include any suitable information such as icons, text, pictures, video, documents, a webpage, or any other suitable information. The information may be associated with, for example, a home page, a menu or submenu, an application or applications, a webpage, and so forth.

The information 206 in the example of FIG. 2 is a picture that may be received at the portable electronic device 100 or may be captured utilizing a camera of the portable electronic device 100. The information may be any other suitable information, however, such as the banking information illustrated in the example of FIG. 7 and FIG. 8 and referred to further herein. The present application is directed to any suitable information.

Figure 3:
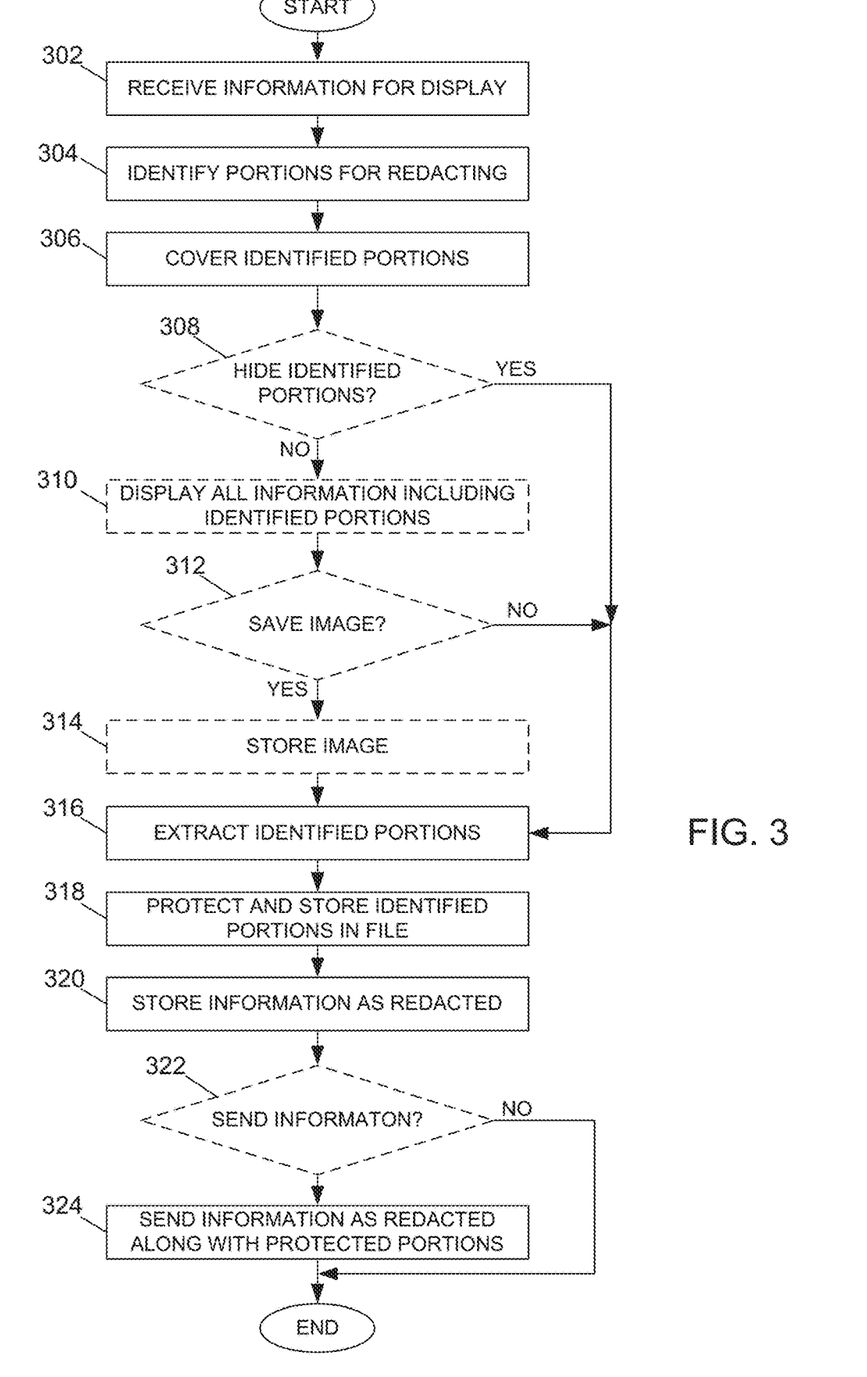
FIG. 3 is a flowchart illustrating a method of providing information in accordance with an aspect of the present disclosure.

A flowchart illustrating a method of providing information for display, from a portable electronic device, such as the portable electronic device 100, is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 102, of the portable electronic device to perform the method may be stored in a computer-readable storage medium, such as a non-transitory computer-readable medium.

Information is received and displayed on the display 112 at 302. The information may include text, characters, symbols, images, icons, and other items that may be displayed or rendered on a portable electronic device 100 in association with an application executed by the processor 102, such as, for example, a SMS, an electronic mail, calendar, address book, word processor, Web browser, or any other suitable application. The information may be information received from another electronic device in communication with the electronic device 100, may be information stored on the electronic device 100 and thus received at the processor 102 from memory such as the memory 110, information received at the processor 102 from an input device such as the keyboard 120, for example, during composition of a document, message, note, or any other suitable information.

Portions of the information received and displayed at 302 are identified for redacting the information at 304. The portions may be identified by user-interaction, utilizing a redaction application, for example, by selecting the portions of information to remain private or hidden. The redaction application can optionally be a standalone application that executes on top of or independently of the other applications executed by the processor mentioned in the previous paragraph. Or the redaction functionality described herein can be incorporated into one or more of the other applications executed by the processor previously mentioned. In one example, the user may interact with the navigation device 140 to identify the portions of the information. Optionally, the user may interact with the touch-sensitive display 118 to identify the portions of the information. For example, a drag operation may be utilized to draw a rectangle or oval around a portion of the information to remain private or hidden.

Optionally, portions of the information received and displayed at 302 may be automatically identified. Portions of the information may be automatically identified based on any suitable criteria. For example, portions of the information may be identified by analyzing the strings or images to identify portions of the information that were previously identified in other information. Thus, the portable electronic device 100 may maintain a list or history of previous redactions from information and may identify portions of information displayed at 302 that is determined to match those previous redactions. Portions of information may also be identified, for example, by identifying strings that are passwords or other sensitive information. Personal data such as names, phone numbers, contact information, locations or addresses or other personal information may also be automatically identified at 304.

The identification of each portion may include a starting location within the information for the portion, as well as a width and a height of the portion. Alternatively, the portions may be identified by a starting point and an end point in a string or strings in a document, or message, for example. Portions may also be identified by, for example, a center point and a radius in the case of a circular area, or by a center point and one or more axes, such as a major axis and minor axis in the case of an oval. Any suitable information to identify the area of the portion may be utilized.

The identified portions are covered at 306, for example, by an opaque cover, such as a rectangle, oval, or other suitable shape such that the identified portions are no longer visible. Optionally, the cover may be semi-transparent to facilitate viewing of the identified portions of the information prior to extraction of the identified portions from the information.

The identified portions may alternatively be uncovered, for example, by user selection of an option to show the document including the portions identified for redacting. A determination may be made at 308 whether to show the redacted portions. In response to receipt of a selection to show the information as redacted, i.e., the identified information is not shown, the process continues at 316. In response to receipt of a selection to show the identified information, such that the identified information is visible, the process may continue at 310.

The portions are uncovered at 310 such that the opaque cover is not displayed and the un-redacted information is visible. In response to selection of an option to save an image of the un-redacted information at 312, an image of the un-redacted information is stored at 314. The image may be stored in memory such as the memory 110.

Uncovering of the portions may be advantageous for reviewing a document or other information after identifying one or more portions of the information that are covered. Such uncovering may be particularly advantageous for reviewing information in which many portions are identified throughout the information.

The portions identified for redacting at 304 and covered at 306 are extracted from the information at 316. As indicated above, the identification of each portion may include a starting location within the information for the portion, as well as a width and a height of the portion. Alternatively, the portions may be identified by a starting point and an end point in a string or strings in a document or message, for example. Portions may alternatively be identified by, for example, a center point and a radius in the case of a circular area, or by a center point and one more axes, such as a major axis and minor axis in the case of an oval. Any suitable information to identify the area of the portion may be utilized.

Each portion of the information that is identified at 304 is extracted at 316 to provide the remaining redacted information and the extracted portions. The portions may be extracted as images, as text, or in any suitable format In the example of the picture such as that shown in FIG. 2, the portions identified are extracted as images.

The extracted portions are protected and stored in association with the location information at 318. The extracted portions are protected by encrypting utilizing a key or are protected utilizing a password. Each extracted portion may be stored in association with a starting point for the extracted portion. Alternatively, the extracted portion may be stored in association with a center point. The extracted portions and their respective locations may be associated, for example, in a mapping or lookup table. The extracted portions are stored in a file in memory, such as the memory 110. The information as redacted, i.e., without the extracted portions, is also stored in memory, such as the memory 110, at 322.

In response to receipt of a command to send the information to a recipient, for example, via email, SMS, or other suitable application at 322, the process continues at 324. The receipt of the command may be, for example, receipt of a selection of a send command to send a message, including the information, from the email or SMS application. The information, as redacted, is sent to the recipient at 324. The file including the protected extracted portions is also sent to the recipient. For example, the portable electronic device 100 may create an image file including the information, as redacted, to facilitate opening and viewing by the recipient. The image file may be attached to a message for which a default subject and body may be prepared. A second file, including the protected extracted portions and their respective locations may also be attached.

The process described above with reference to FIG. 3 may be repeated, for example, to redact the information further or for another user to redact the information. For example, a recipient of the information, as redacted, and the file, including the extracted portions, may repeat the process by identifying further portions of the information that are extracted from the information, protected, and stored in the file. Optionally, the further portions of the information may be associated with a second passphrase or key that differs from the passphrase or key utilized to protect the information previously extracted. Thus, different passphrases or keys may be utilized to protect different portions of information stored in the file.

The further portions of the information may also be associated with a format that differs from the format of the previously extracted information. Thus, when the passphrases or keys are utilized to show all the information on a further electronic device, the portions extracted and reinserted into the information for display are shown in a format that is dependent on, for example, the source of the extraction. Alternatively, the format may be dependent on a time period in which the extracted portion was identified or extracted, or a security level required for viewing.

Figure 4:
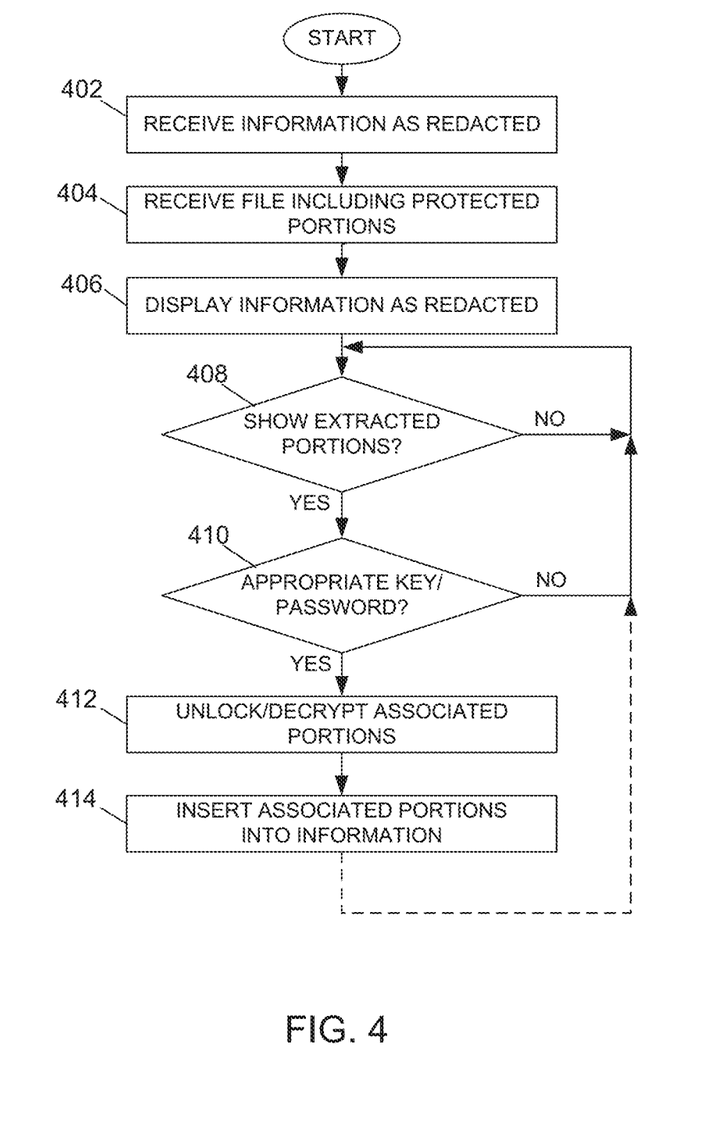
FIG. 4 is a flowchart illustrating a method of displaying information in accordance with another aspect of the disclosure.

A flowchart illustrating a method of displaying the information on a display of a portable electronic device is shown in FIG. 4. The method may be carried out by software executed, for example, by the processor. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, such as a non-transitory computer-readable medium.

The information, such as the information sent from the portable electronic device 100 as described at 324 of FIG. 3, is received at the recipient portable electronic device. The file, including the extracted portions associated with respective locations, is also received at 404. The extracted portions are protected utilizing one or more passwords and/or keys.

The information is displayed on the display of the portable electronic device at 406, without the extracted portions. In response to receipt of a command to show one or more of the extracted portions at 408, the process continues at 410. For example, the user may select or click on a location from which a portion was extracted or may select an option to show the extracted portions in a menu or submenu. Alternatively, a command to show the extracted portions may be automatically received for a document from which portions are extracted or in response to receipt of the file including the extracted portions.

In response to entry of an associated password or selection of an associated decryption key at 410, the process continues at 412 and the extracted portions associated with the entered password or selected decryption key are unlocked or unencrypted. Utilizing the associated location information from the file, the unlocked or decrypted portions are reinserted into the appropriate locations in the information at 414.

The process of receipt of password or selection of a decryption key may be repeated in the case that sets of extracted portions are protected utilizing respective different passwords or encryption keys. A second set of extracted portions of the information may be displayed in a different format than the format that the first set of extracted portions is displayed in, to facilitate identification of the extraction source, for example, the user that selected the portion of information for extraction, or the time of selection or extraction, or a level of security associated with the portion of information.

Optionally, the unlocking or decryption of the extracted portions may occur without prompting the user to enter the passphrase or select the decryption key. Instead, the passphrase may be stored on the portable electronic device or the key may be stored in a keystore on the portable electronic device and a key lookup may be performed based on a key identifier in the file. In the event that the keystore is already unlocked user authentication may be unnecessary.

In the example, referred to above in which the portable electronic device 100 may create an image file including the information, as redacted and attached the image file to the message, the image file may be viewed by the recipient in any suitable viewing application. The image file may also be opened in a redaction application and then prompt for the password or key when the user attempts to view the extracted content.

Figure 5:
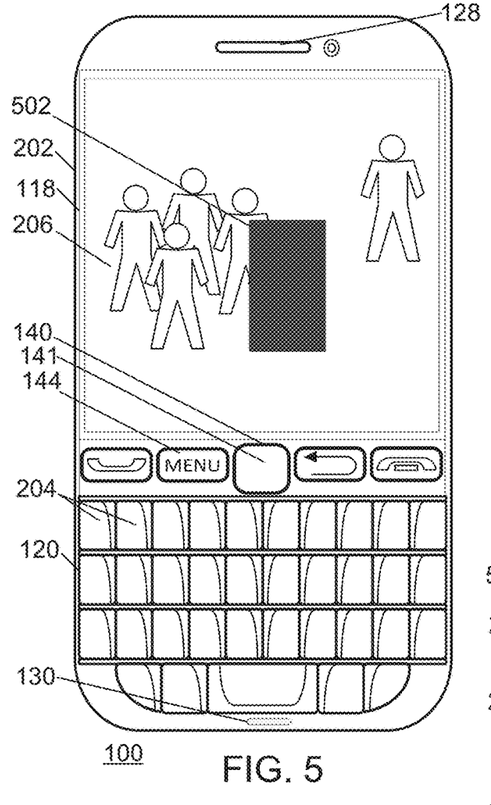
FIG. 5 and FIG. 6 are front views of an example of an electronic device in accordance with one example of the method of FIG. 3 and the method of FIG. 4.

Reference is made again to FIG. 3 with reference to FIG. 2, FIG. 4, and FIG. 5 to describe a particular example of the method of providing information for display, in accordance with the present disclosure. In the example of FIG. 2, FIG. 4, and FIG. 5, the information received at 302 is a picture, which may be a picture captured utilizing a camera of the portable electronic device 100, for example.

A portion 502 of the information 206 is identified for redacting the information at 304. In the present example, the portion of the information is identified by user-selection, such as by utilizing the touch-sensitive display 118 to identify opposing corners of a rectangular portion of the information. The information 206 is displayed with an opaque rectangle covering the portion 502 identified at 306. For the purpose of the present example, the portion identified is an image of a person in the picture.

At 318, the portion 502 is extracted from the picture and an image of the portion 502 is encrypted and stored in a file in association with the location information identifying the location within the information 206 from which the portion was extracted. As indicated, the location information may include a starting location of the portion 502.

The information that remains after the portion 502 is extracted is also stored at 320. The information that remains is then sent, for example, by email, to a second portable electronic device user, along with the file that includes the encrypted extracted portion and associated location information.

Figure 6:
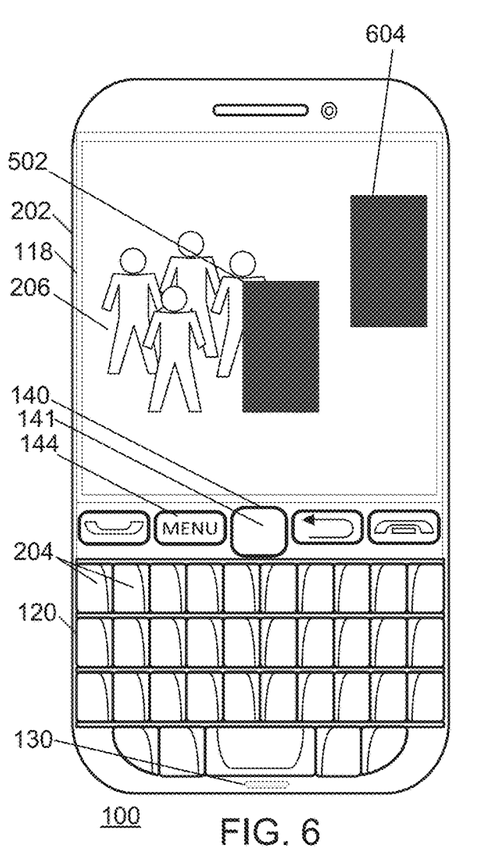

Referring to FIG. 4 and to FIG. 6, the remaining information is received at the second portable electronic device at 402. The file including the extracted portion and associated location information is also received at 404. The remaining picture is displayed at 408, with no image displayed at the location from which the portion was extracted. For the purpose of the present example, the user of the second portable electronic device 402 selects the location from which the portion was extracted and is prompted for a decryption key. In response to selection of the associated decryption key at 410, the extracted portion is decrypted at 412 and is reinserted into the picture at 414 to provide the un-redacted image, as illustrated in FIG. 2.

The process of FIG. 3 may be repeated at the second portable electronic device and a second portion 604 is identified by the second user, encrypted and extracted to, for example, extract an image of a second person in the picture. The second extracted portion 604, i.e., the image of the second person, may be encrypted utilizing a different encryption key and stored in the same file as the first extracted portion. Thus, a second decryption key is utilized to decrypt the second portion 604.

Figure 7:
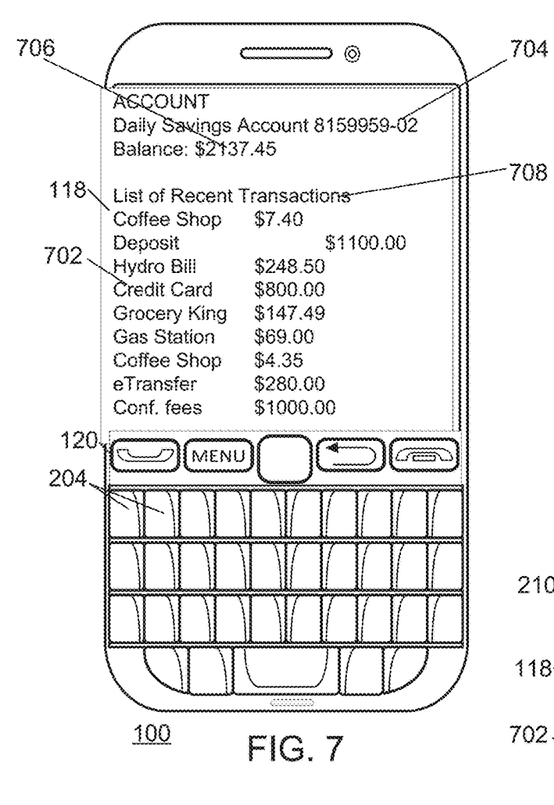
FIG. 7 and FIG. 8 are front views of an example of an electronic device in accordance with another example of the method of FIG. 3.
Figure 8:
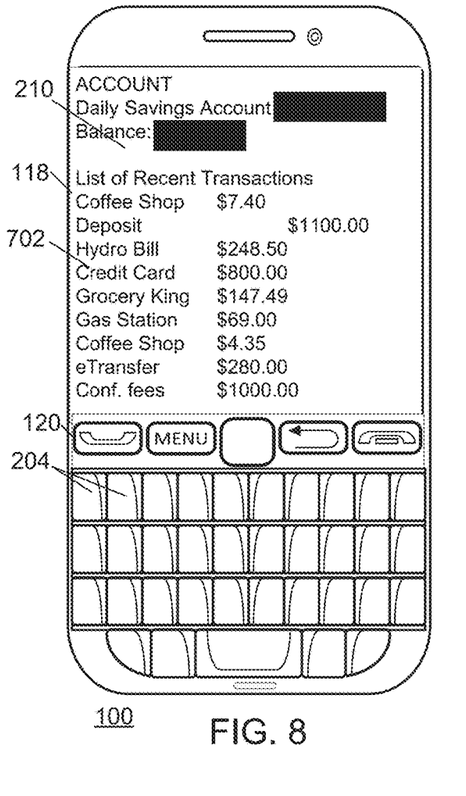

Reference is now made to FIG. 7 and FIG. 8 to describe another example of the method of providing information for display, in accordance with the present disclosure. In this example, the information received at 402 includes banking information 702. The information can optionally be included in a structured document or file that is used to generate the displayed information. The banking information includes an account number 704, an account balance 706, and banking transaction information 708 for display on the touch-sensitive display 118.

Portions of the information are identified for redacting the information at 304. In the present example, the portions of the information are identified by selecting start and end points of the portions of the information utilizing the navigation device 140. The portions of the information in the present example include the account number 704 and the account balance 706.

At 318, the portions, including the account number 704 and the account balance 706 are extracted from the information and the account number 704 and the account balance 706 are stored in a file in association with the location information identifying the respective locations within the information 206, from which the portions were extracted. The location information includes a starting location and an end location in the information or start location and length. The extracted text can be replaced in the original presentation, document or file with a placeholder, placeholder text, coded text, or other indication appropriate for the presentation, document or file.

The information that remains after the portions are extracted is also stored at 320. The information that remains is then sent, for example, by email, to a second portable electronic device user, along with the file that includes the encrypted extracted portions and associated location information.

Figure 9:
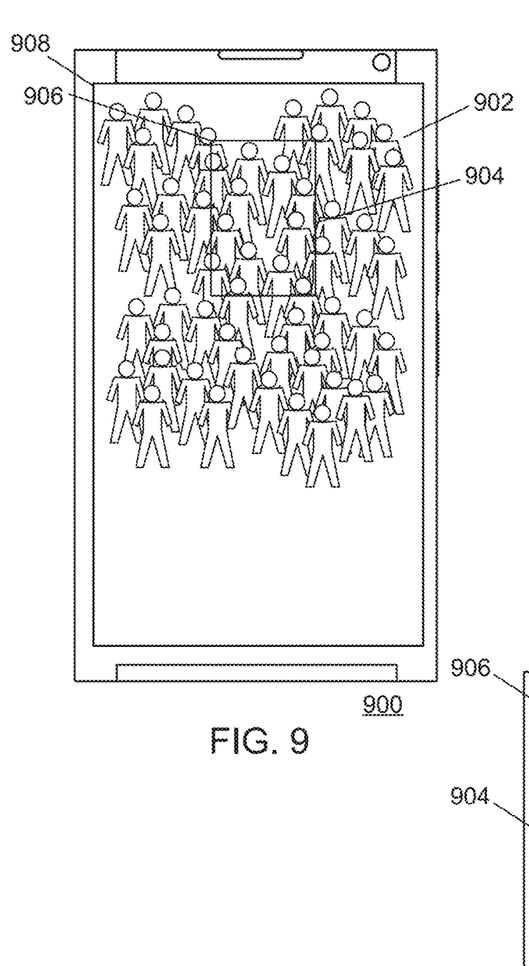
FIG. 9 and FIG. 10 are front views of another example of an electronic device.
Figure 10:
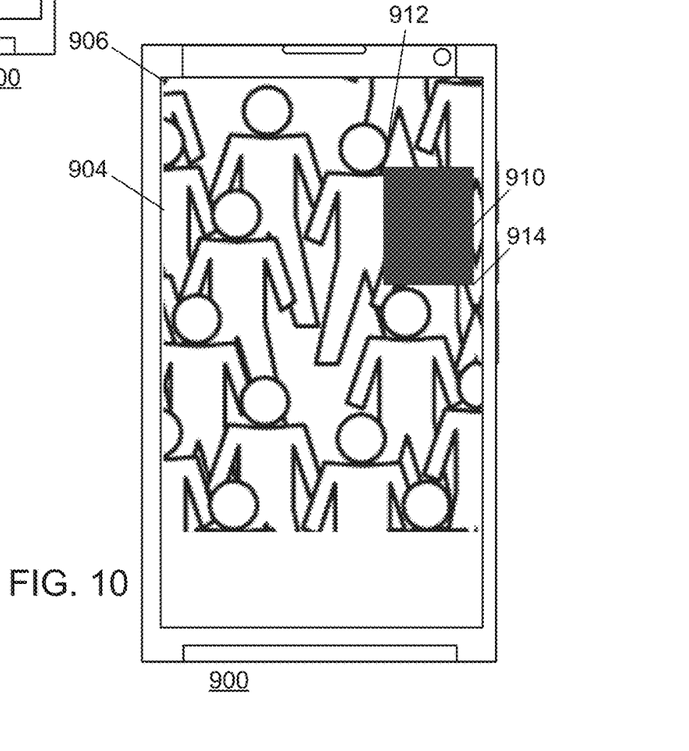
Figure 11:
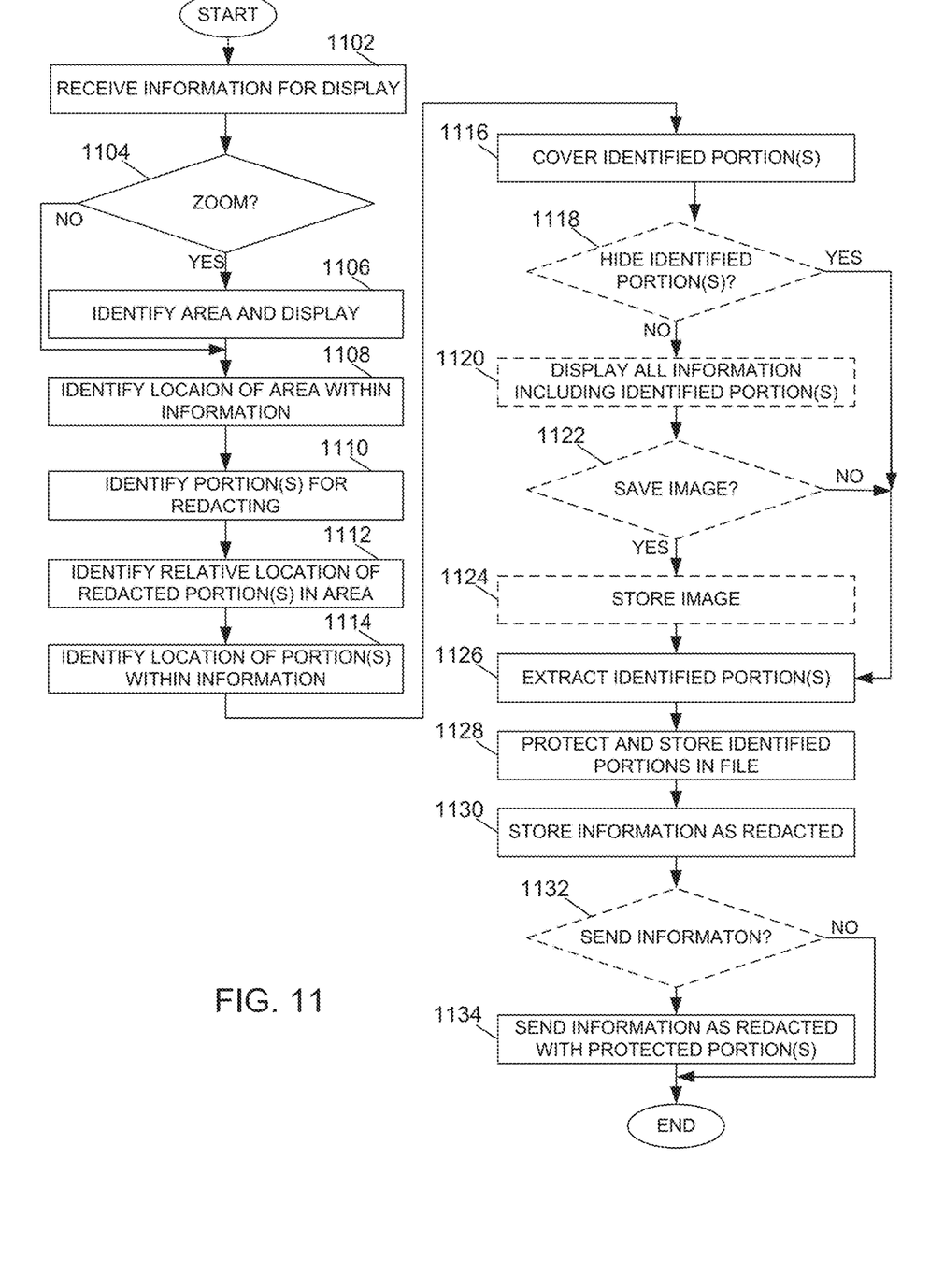
FIG. 11 is a flowchart illustrating another method of providing information in accordance with an aspect of the present disclosure.

Referring now to FIG. 9 through FIG. 11, another example of providing information for display, in accordance with the present disclosure is shown. The portable electronic device shown in FIG. 9 and FIG. 10 is indicated generally by the numeral 900 and does not include a physical keyboard. The remaining elements of the portable electronic device 900 may be similar to those described above with reference to FIG. 1 and are therefore not further described herein. The present method is applicable to portable electronic devices that include a physical keyboard and to portable electronic devices that do not include a physical keyboard.

In the example of FIG. 9 and FIG. 10, the information received at 1102 is a picture 902, which may be a picture captured utilizing a camera of the portable electronic device 900, for example. The picture 902 in this example is a picture of a crowd of people. Selecting a part of an image of one person for redacting may be difficult. Zooming in on an area of the picture 902 may be desirable for accurate identification of a portion of the information for redacting. In this example shown in FIG. 9, the user identifies an area 904 to display at a greater magnification at 1104, i.e., to zoom in on to facilitate selection of a portion for redacting. The area may be identified in any suitable manner. For example, a zoom tool may be provided. A zoom command may be received at the portable electronic device by user-selection of a zoom tool followed by a touch at corners of the area or at a center of the area on the touch-sensitive display, resulting in zooming in on area at 1106. In the example of FIG. 9, the user selects the area 904 and the area 904 is displayed on the touch-sensitive display at a higher magnification, as illustrated in FIG. 10.

A location of the area 904 in FIG. 9 relative to the entire picture 902 shown in FIG. 9 is determined at 1108. For example, a location of an upper left corner 906 of the area 904 relative to an upper left corner 908 of the picture 902 may be determined. Alternatively, a location of a center of the area 902 relative to a center of the picture 902 may be determined. X and Y offsets from the upper left corner 908 of the picture 902, may be utilized to identify the upper left corner 906 of the area 904 or the center. Optionally, the aspect ratio or length to width ratio may be preset or may be based on user selection. Thus, the location of the lower right corner of the area may be determined based on the location of the upper left corner 906 of the area or may be determined based on user input.

A portion 910 of the magnified information, i.e., the area 904, is identified for redacting the information at 1110. In the present example, the portion 910 of the area 904 is identified by user-selection, such as by utilizing the touch-sensitive display to identify opposing corners of a rectangular portion of the area 904. For the purpose of the present example, the portion identified is an image of a person in the area 904. A location of the portion 910 relative to the area 904 displayed is determined at 1112.

The location of the upper left corner 912 of the portion 910 and lower right corner 914 of the portion 910 may be identified relative to the location of the upper left corner 906 of the area 904. Thus, X and Y offsets of the upper left corner 912 and lower right corner 914, both from the upper left corner 906 of the area 904, may be identified. Utilizing the identified X and Y offsets of the upper left corner 912 and the lower right corner 914 and the identified X and Y offsets of the upper left corner 906 of the area 904 from the upper left corner of the picture 902, the X and Y offsets of the opposing corners of the portion 910 from the upper left corner 908 of the picture 902, are determined. Thus, the position and size of the redacted portion 910 relative to the entire picture 902 are identified at 1114. The position and size of the redacted portion 910 relative to the entire picture 902 may alternatively be determined utilizing X and Y offsets of the center of the area, X and Y offsets of the center of the portion, and a length and width of the portion, or utilizing any other suitable location information relative to the picture 902.

The identified portion is covered at 1116, for example, by an opaque cover, such as a rectangle, oval, or other suitable shape such that the identified portions are no longer visible. Optionally, the cover may be semi-transparent to facilitate viewing of the identified portion of the information prior to extraction of the identified portion from the information. Viewing may be advantageous in situations in which several portions are identified for redacting.

The identified portion may alternatively be uncovered, for example, by user selection of an option to show the document including the portion identified for redacting. A determination may be made at 1118 whether to show the redacted portions. In response to receipt of a selection to show the information as redacted, i.e., the identified information is not shown, the process continues at 1126. In response to receipt of a selection to show the identified information, such that the identified information is visible, the process may continue at 1120.

The portion is uncovered at 1120 such that the opaque cover is not displayed and the un-redacted information is visible. In response to selection of an option to save an image of the un-redacted information at 1122, an image of the un-redacted information is stored at 1124. The image may be stored in memory.

At 1126, the portion 910 is extracted from the picture 902 and, at 1128, an image of the portion 910 is encrypted and stored in a file in association with the location information identifying the position and size of the redacted portion 910 relative to the entire picture 902 from which the portion 902 was extracted.

The picture that remains after the portion 910 is extracted is also stored at 1130. In response to receipt of an input command to send the information at 1132, the information that remains is sent at 1134, for example, by email, to a second portable electronic device user, along with the file that includes the encrypted extracted portion and associated location information.

Although the description above describes a single portion identified and extracted, multiple portions may be identified and extracted. The location of each of the portions is identified based on an offset of a magnified area relative to the information and based on an offset of the portion relative to the magnified area.

As described above with reference to FIG. 4, the remaining information is received at a second electronic device. The file including the extracted portion and associated location information is also received at 404. The remaining picture is displayed at 408, with no image displayed at the location from which the portion was extracted. For the purpose of the present example, the user of the second portable electronic device 402 selects the location from which the portion was extracted and is prompted for a decryption key. In response to selection of the associated decryption key at 410, the extracted portion is decrypted at 412 and is reinserted into the picture at 414 utilizing the X and Y offsets of the opposing corners of the portion 910 from the upper left corner 908 of the picture 902, to provide the un-redacted picture.

FIG. 11 is described above with reference to FIGS. 9 and 10, in which the information is a picture. The method described with reference to FIG. 11, however, is also applicable to a document, an image or any other suitable information, including, for example, a document created utilizing a word processor, a pdf document, a drawing, or any other suitable document.

Advantageously, the extraction of the portions of information to provide the remaining information, as redacted, and a file including the protected portions of information and location information. To provide the information to another electronic device, the remaining information is sent and the file is sent. Thus, rather than sending both a redacted version of the information and a version that is not redacted, the remaining information is sent and the portions extracted are sent, reducing the size of the files sent from the portable electronic device. This reduction is file size also reduces bandwidth utilized for sending and receiving utilizing the portable electronic device.

The scope of the claims should not be limited by the preferred embodiments set forth in the examples, but should be given the broadest interpretation consistent with the description as a whole.

What is claimed is:

1. A method of providing information for display, from a portable electronic device, the method comprising:
    displaying information on a display of the portable electronic device;
    identifying a portion for redacting from the information displayed on the display of the portable electronic device;
    extracting the portion from the information to provide redacted information and an extracted portion;
    storing the redacted information;
    protecting and storing the extracted portion together with a location identifier in a file that is separate from the redacted information, wherein the location identifier includes a location within the information that the extracted portion was extracted from and a single area size value of the extracted portion; and
    sending the redacted information and sending the file including the extracted portion and the location identifier.

2. The method of claim 1, comprising:
    in response to receipt of a zoom command prior to identifying the portion, displaying an area of the information at a greater magnification;
    wherein identifying the portion for redacting comprises identifying from the area of the information displayed at a greater magnification on the display of the portable electronic device; and
    determining the location identifier of the portion within the information prior to protecting and storing the extracted portion in association with the location.

3. The method according to claim 2, wherein determining the location identifier of the portion within the information comprises utilizing a determined location of the area within the information and a determined location of the portion for redacting within the area.

4. The method according to claim 1, wherein the extracted portion is associated with a first passphrase or key for unlocking or decrypting.

5. The method according to claim 4, wherein protecting and storing comprises protecting and storing the extracted portion along with a previously extracted portion stored in the file.

6. The method according to claim 5, wherein the previously extracted portion is associated with a second passphrase or key that differs from the first passphrase or key.

7. The method according to claim 6, wherein the extracted portion is associated with a first format and the previously extracted portion is associated with a second format for identifying an extraction source or time period.

8. The method according to claim 1, comprising receiving, at the portable electronic device, a command to show redacted portions and, in response, displaying the information in un-redacted form prior to extracting the portion.

9. The method according to claim 8, comprising, storing an image of the information in the un-redacted form in response to receipt of a command to store the image.

10. A non-transitory computer-readable medium having computer-readable code stored thereon, the computer-readable code executable by at least one processor of a portable electronic device to cause the portable electronic device to:
    display information on a display of the portable electronic device;
    identify a portion for redacting from the information displayed on the display of the portable electronic device;
    extract the portion from the information to provide redacted information and an extracted portion;
    store the redacted information;
    protect and store the extracted portion together with a location identifier in a file that is separate from the redacted information, wherein the location identifier includes a location within the information that the extracted portion was extracted from and a single area size value of the extracted portion; and
    send the redacted information and sending the file including the extracted portion and the location identifier.

11. A method of displaying information on a portable electronic device, the method comprising:
    receiving, at the portable electronic device, redacted information;

receiving, at the portable electronic device, a file that is separate from the redacted information and that includes one or more first extracted portions stored together with respective location identifiers, wherein each location identifier includes a location within information that the associated one or more first extracted portion was extracted from and a single area size value of the associated one or more first extracted portion, the one or more first extracted portions being protected; and in response to receipt of a first passphrase or key associated with the one or more first extracted portions, unlocking or decrypting the one or more first extracted portions, and inserting the one or more first extracted portions into the redacted information utilizing the location identifiers to provide un-redacted information.

12. The method according to claim 11, wherein the file including the one or more first extracted portions also includes one or more second extracted portions stored in association with second respective location identifiers, the one or more second extracted portions being protected, the method further comprising, in response to receipt of a second passphrase or key associated with the one or more second extracted portions, unlocking or decrypting the one or more second extracted portions, and inserting the one or more second extracted portions into the redacted information utilizing the second respective location identifiers to provide un-redacted information.

13. A non-transitory computer-readable medium having computer-readable code stored thereon, the computer-readable code executable by at least one processor of a portable electronic device to cause the portable electronic device to:

receive, at the portable electronic device, redacted information;

receive, at the portable electronic device, a file that is separate from the redacted information and that includes one or more first extracted portions stored together with respective location identifiers, wherein each location identifier includes a location within information that the associated one or more first extracted portion was extracted from and a single area size value of the associated one or more first extracted portion, the one or more first extracted portions being protected; and in response to receipt of a first passphrase or key associated with the one or more first extracted portions, unlock or decrypt the first extracted portions, and insert the one or more first extracted portions into the redacted information utilizing the location identifiers to provide un-redacted information.

14. A portable electronic device comprising:
a display for displaying information;
an input device;
a processor operably coupled to the input device for receiving input therefrom and coupled to the display, wherein the processor is configured to:
identify a portion for redacting from the information displayed on the display of the portable electronic device;
extract the portion from the information to provide redacted information and an extracted portion;
store the redacted information;
protect and store the extracted portion together with a location identifier in a file that is separate from the redacted information, wherein the location identifier includes a location within the information that the extracted portion was extracted from and a single area size value of the extracted portion; and
send the redacted information and sending the file including the extracted portion and the location identifier.

15. The portable electronic device of claim 14, wherein the processor is configured to:
in response to receipt of a zoom command prior to identifying the portion, display an area of the information at a greater magnification;
wherein the portion for redacting is identified from the area of the information displayed at a greater magnification on the display of the portable electronic device; and
determine the location identifier of the portion within the information prior to protecting and storing the extracted portion in association with the location.

16. The portable electronic device according to claim 15, wherein the location identifier of the portion within the information is determined utilizing a determined location of the area within the information and a determined location of the portion for redacting within the area.

17. The portable electronic device according to claim 14, wherein the extracted portion is associated with a first passphrase or key for unlocking or decrypting.

18. The portable electronic device according to claim 17, wherein the processor is configured to lock or encrypt the extracted portion and to store the extracted portion along with previously extracted portions in the file.

19. The portable electronic device according to claim 18, wherein the previously extracted portions are associated with a second passphrase or key that differs from the first passphrase or key.

20. The portable electronic device according to claim 19, wherein the processor is configured to associate the extracted portion with a first format and the previously extracted portions are associated with a second format for identifying an extraction source or time period.

* * * * *